(12) United States Patent
Nakamura

(10) Patent No.: US 10,254,743 B2
(45) Date of Patent: Apr. 9, 2019

(54) NUMERICAL CONTROL APPARATUS AND LOGGING METHOD

(71) Applicant: Mitsubishi Electric Corporation, Tokyo (JP)

(72) Inventor: Naoki Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 414 days.

(21) Appl. No.: 15/035,280

(22) PCT Filed: Dec. 16, 2013

(86) PCT No.: PCT/JP2013/083645
§ 371 (c)(1),
(2) Date: May 9, 2016

(87) PCT Pub. No.: WO2015/092853
PCT Pub. Date: Jun. 25, 2015

(65) Prior Publication Data
US 2016/0291576 A1    Oct. 6, 2016

(51) Int. Cl.
*G05B 19/418*    (2006.01)
*G05B 19/4063*    (2006.01)

(52) U.S. Cl.
CPC .......... *G05B 19/4063* (2013.01); *G05B 2219/50206* (2013.01)

(58) Field of Classification Search
CPC .......... G05B 2219/33305; G05B 2219/35291; G05B 19/4063; G05B 19/4184
See application file for complete search history.

(56) References Cited

U.S. PATENT DOCUMENTS

2009/0125139 A1    5/2009    Endo et al.

FOREIGN PATENT DOCUMENTS

| | | |
|---|---|---|
| JP | 5-73125 A | 3/1993 |
| JP | 6-86580 A | 3/1994 |
| JP | 2000-122717 A | 4/2000 |
| JP | 2001-287254 A | 10/2001 |
| JP | 2003-22108 A | 1/2003 |
| JP | 2006-39640 A | 2/2006 |
| JP | 2007-222997 A | 9/2007 |
| JP | 2009-122852 A | 6/2009 |
| JP | 2012-2640 A | 1/2012 |
| JP | 2012-228734 A | 11/2012 |

OTHER PUBLICATIONS

Japanese Office Action of Application No. 2014-525232 dated Sep. 24, 2014.
International Search Report of PCT/JP2013/083645 dated Mar. 18, 2014.

*Primary Examiner* — Thomas L Dickey
(74) *Attorney, Agent, or Firm* — Sughrue Mion, PLLC; Richard C. Turner

(57) ABSTRACT

A numerical control apparatus has a detector, a condition generator, and a logging processor. The detector detects occurrence of a preset event. The condition generator acquires, as a reference value, first numerical control information at a timing when the occurrence of the event is detected, and performs preset first arithmetic processing by using the reference value to generate a first determination condition. When the first numerical control information satisfies the first determination condition, the logging processor starts a process of logging second numerical control information.

12 Claims, 4 Drawing Sheets

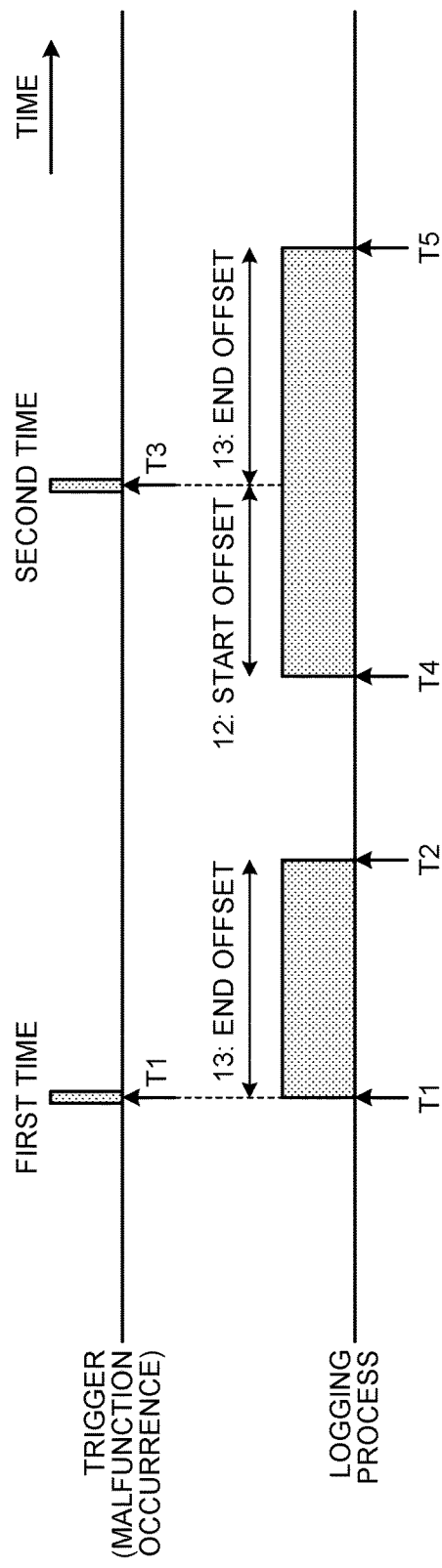

NUMERICAL CONTROL APPARATUS AND LOGGING METHOD

CROSS REFERENCE TO RELATED APPLICATIONS

This application is a National Stage of International Application No. PCT/JP2013/083645 filed Dec. 16, 2013, the contents of which are incorporated herein by reference in their entirety.

FIELD

The present invention relates to a numerical control apparatus and a logging method.

BACKGROUND

In a system that executes numerical control (NC) of a machine tool by using a numerical control apparatus, it is a general procedure at a time of malfunction occurrence such as alarm warning to log diagnosis information for identifying a cause for the malfunction occurrence. The reason is that the diagnosis information before and after the malfunction occurrence may be necessary for identifying the cause for the malfunction occurrence.

According to a technique disclosed in Patent Literature 1, as an example of a technique for acquiring the diagnosis information before and after the malfunction occurrence, a numerical control apparatus sequentially overwrites and stores the diagnosis information in a circulating memory until a malfunction occurs, and then, when an malfunction occurs, stores the diagnosis information in a logging buffer memory provided separately from the circulating memory.

As another example, Patent Literature 2 discloses a numerical control apparatus in which a logging start condition and a logging end condition are set in advance.

CITATION LIST

Patent Literatures

Patent Literature 1: Japanese Patent Application Laid-open No. 2012-2640
Patent Literature 2: Japanese Patent Application Laid-open No. 2006-39640

SUMMARY

Technical Problem

However, according to the technique described in Patent Literature 1, it is required to always perform the logging of the diagnosis information even when no malfunction occurs, in order to log the diagnosis information before and after the malfunction occurrence. As a result, a CPU load is increased and, in some cases, performance is deteriorated, which is a problem. In particular, when trying to identify causes for plural kinds of malfunction occurrence, desired information to be acquired differs depending on the kind of the malfunction and thus it is required to continue logging a large amount of diagnosis information with regard to the plural kinds of malfunction whose occurrence timings are unknown.

According to the technique described in Patent Literature 2, when it is desired to acquire the diagnosis information before and after the malfunction occurrence such as alarm warning as a trigger, it is difficult for a user to forecast and set the logging start condition and the logging end condition with respect to the malfunction whose timing and location are unknown, which is a problem.

The present invention has been achieved in view of the above problems, and an object of the present invention is to provide a numerical control apparatus and a logging method that can efficiently acquire diagnosis information near a timing of malfunction occurrence which is necessary for identifying a cause for the malfunction occurrence.

Solution to Problem

To solve the above-mentioned problems and achieve the object, the present invention is characterized by comprising: a detection unit to detect occurrence of a preset event; a condition generation unit to refer to sequentially-changing first numerical control information, when the detection unit detects the occurrence of the preset event, to acquire, as a reference value, the first numerical control information at a timing when the occurrence of the event is detected, and to perform preset first arithmetic processing by using the reference value to generate a first determination condition; and a logging processing unit to start a process of logging sequentially-changing second numerical control information, when the sequentially-changing first numerical control information satisfies the first determination condition.

Advantageous Effects of Invention

The numerical control apparatus according to the present invention can acquire the diagnosis information immediately before the malfunction occurrence, without always performing a process of logging the diagnosis information and without fixedly setting a start timing of the logging process by a user. It is therefore possible to efficiently acquire the diagnosis information near the timing of the malfunction occurrence.

BRIEF DESCRIPTION OF DRAWINGS

FIG. 4 is a timing chart for explaining start and end of a logging process.

DESCRIPTION OF EMBODIMENTS

Exemplary embodiments of a numerical control apparatus and a logging method according to the present invention will be explained below in detail with reference to the accompanying drawings. It should be noted that the present invention is not limited to the embodiments.

First Embodiment.

Figure 1:
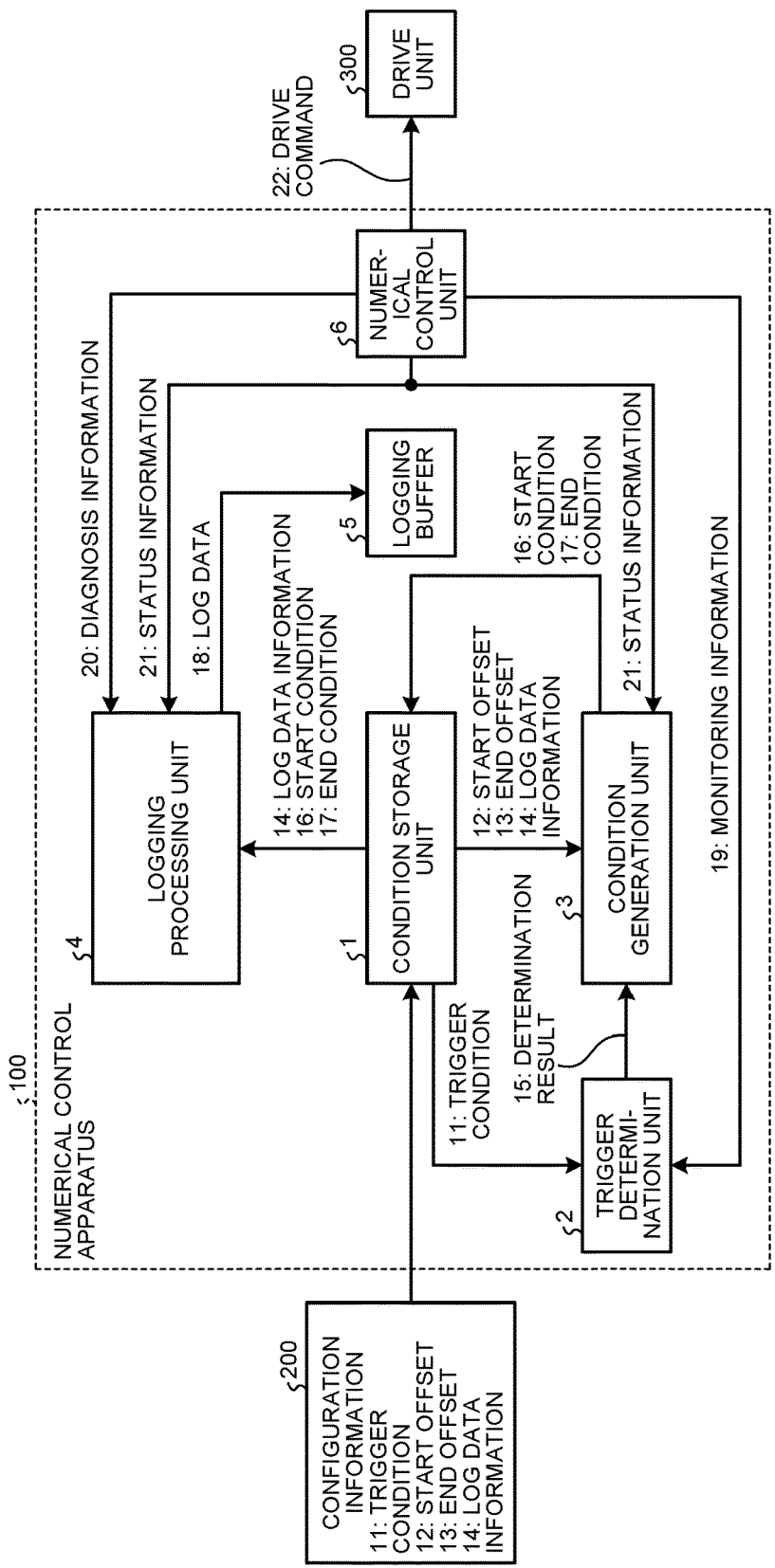
FIG. 1 is a diagram illustrating a functional configuration of a numerical control apparatus according to a first embodiment.

FIG. 1 is a diagram illustrating a functional configuration of a numerical control apparatus according to a first embodiment of the present invention. A numerical control apparatus 100 is connected to a drive unit 300 of a machine tool. The drive unit 300 includes, for example, a servo amplifier that drives a motor. The numerical control apparatus 100 supplies a drive command 22 to the drive unit 300.

Configuration information 200 regarding a logging process is externally set to the numerical control apparatus 100. The configuration information 200 includes a trigger condition 11, a start offset 12, an end offset 13, and log data information 14. Details of the information included in the configuration information 200 will be described later.

The numerical control apparatus 100 has a condition storage unit 1, a trigger determination unit 2, a condition generation unit 3, a logging processing unit 4, a logging buffer 5, and a numerical control unit 6.

The numerical control unit 6 performs a numerical control process based on a machining program (a machining program 36) incorporated therein. The numerical control process is a process that generates the drive command 22 supplied to the drive unit 300. The machining program 36 is configured to include a plurality of blocks, each block serving as a unit of an instruction. A block number which is unique in the machining program 36 is given to each block. The plurality of blocks constituting the machining program 36 are analyzed and executed in order from the beginning. For example, the block numbers are given to the respective blocks so as to be in ascending order from the beginning of the machining program 36. In the following description, a simple expression of "block number" indicates the block number in the machining program 36.

The numerical control process performed by the numerical control unit 6 consists of one or more processes. For example, the numerical control process includes processes such as an analysis process of reading a block from the machining program 36 and analyzing an instruction described in the read block, an interpolation process of interpolating a trajectory of the machine tool based on an analysis result obtained by the analysis process, an acceleration and deceleration process of accelerating and decelerating a moving speed of the machine tool on the interpolated trajectory, and a command generation process of generating a position command or a speed command for each operation period for moving the machine tool at the speed obtained by the acceleration and deceleration process. Note that the data output by each process, excluding the drive command 22, is referred to as "intermediate data". The numerical control process can include an alarm output process of detecting a malfunction and outputting an alarm notification. The numerical control process can include a feedback process of feeding back a status value (a position detection value or a speed detection value) of the machine tool or a motor. The numerical control process can include an arbitrary filtering process. Other than these processes, the numerical control process can be constituted to include arbitrary processes depending on a method of controlling.

The trigger determination unit 2 functions as a detection unit that detects occurrence of an event that is preset as a malfunction. More specifically, the trigger determination unit 2 reads the trigger condition 11 stored in the condition storage unit 1. Then, the trigger determination unit 2 monitors monitoring information 19 of the numerical control unit 6 to determine whether or not the monitoring information 19 satisfies the trigger condition 11. The trigger determination unit 2 then outputs a determination result 15 to the condition generation unit 3. Here, the trigger determination unit 2 outputs, as the determination result 15, a pulse indicating "trigger condition satisfied" to the condition generation unit 3, at a timing when a state where the monitoring information 19 does not satisfy the trigger condition 11 is changed to a state where the monitoring information 19 satisfies the trigger condition 11.

The monitoring information 19 is information that is monitored for detecting occurrence of the event which is set as the malfunction. An arbitrary type of data can be used as the monitoring information 19. For example, the alarm notification can be used as the monitoring information 19. Arbitrary intermediate data can also be used as the monitoring information 19. For example, a block number, an elapsed time, a moving distance, a used tool number, a commanded speed, a commanded master axis rotating speed, and the like can be used as the monitoring information 19. Various status values obtained from the drive unit 300 can also be used as the monitoring information 19. For example, in a case where the drive unit 300 is a motor, a rotating speed detection value, a position detection value, a speed detection value, or a torque detection value of the motor can be used as the monitoring information 19.

The trigger condition 11 is a determination condition for detecting occurrence of the event which is set as the malfunction. In the case where the alarm notification is used as the monitoring information 19, the trigger condition 11 can be configured to include, for example, the block number or an identification number (an alarm number) that is allocated in advance for each type of alarm. In the case where the used tool number is used as the monitoring information 19, a specific used tool number to be determined as the malfunction can be set as the trigger condition 11. In the case where the elapsed time, the moving distance, the commanded speed, or the commanded master axis rotating speed is used as the monitoring information 19, a threshold value for trigger determination is set as the trigger condition 11. Further, for example, in the case where the trigger condition 11 includes the alarm number, the trigger determination unit 2 determines whether or not an alarm notification having a predetermined alarm number has been detected. Moreover, in the case where the trigger condition 11 includes the alarm number, the trigger determination unit 2 determines whether or not the alarm notification has been detected during execution of a block having a predetermined block number.

When the trigger determination unit 2 detects the occurrence of the event that is set as the malfunction, the condition generation unit 3 uses the start offset 12 and the end offset 13 stored in the condition storage unit 1 to generate a start condition 16 of the logging process and an end condition 17 of the logging process. The condition generation unit 3 stores the generated start condition 16 and end condition 17 in the condition storage unit 1.

Here, the start condition 16 is a determination condition used for determining a start timing of the logging process, and the end condition 17 is a determination condition used for determining an end timing of the logging process. The start condition 16 and the end condition 17 are referred to as a "timing determination condition". The timing determination condition includes a threshold value for example.

According to the present embodiment, the threshold value of the timing determination condition is dynamically generated by performing preset arithmetic processing with respect to a value of status information 21 obtained at the timing when the trigger condition is satisfied. The status information 21 is information (first numerical control information) that is monitored for determining the start timing and the end timing of the logging process. An arbitrary type of information which changes according to the control can be used as the status information 21. For example, a block number, an elapsed time since start of execution of the machining program 36, a moving distance, a used tool number, a commanded speed, or a commanded master axis rotating speed can be used as the status information 21. Further, a rotating speed detection value, a position detection value, a speed detection value, or a torque detection value of a motor can be used as the status information 21.

A value of the status information 21 at the timing when the trigger condition is satisfied is referred to as a "reference value". In the present example, the condition generation unit 3 calculates the threshold value of the timing determination condition by adding or subtracting each preset offset value (the start offset 12 and the end offset 13) to or from the reference value. For example, the condition generation unit 3 calculates the threshold value of the start condition 16 by subtracting the start offset 12 from the reference value. Further, the condition generation unit 3 calculates the threshold value of the end condition 17 by adding the end offset 13 to the reference value.

Whether to add or subtract the start offset 12 with respect to the reference value in order to generate the start condition 16 can be arbitrarily set depending on the type of the status information 21. Similarly, whether to add or subtract the end offset 13 with respect to the reference value in order to generate the end condition 17 can be arbitrarily set depending on the type of the status information 21. Moreover, which of a case where the value of the status information 21 exceeds the threshold value of a case where the value of the status information 21 falls below the threshold value is deemed as the condition satisfaction can also be arbitrarily set depending on the type of the status information 21.

The condition generation unit 3 can recognize the numerical control information set as the status information 21 by reading the log data information 14 from the condition storage unit 1. When the determination result 15 changes from "trigger condition not satisfied" to "trigger condition satisfied", the condition generation unit 3 acquires the specified type of the status information 21 from the numerical control unit 6 and then designates the acquired status information 21 as the reference value.

For example, in a case where the log data information 14 designates the block number as the status information 21, numbers of blocks are set as the start offset 12 and the end offset 13, respectively. The condition generation unit 3 calculates, as the threshold value, a block number by subtracting the number of blocks set as the start offset 12 from the block number of the block being executed at the timing when the trigger condition is satisfied, and sets "exceeding the threshold value" as the start condition 16. Moreover, the condition generation unit 3 calculates, as the threshold value, a block number by adding the number of blocks set as the end offset 13 to the block number of the block being executed at the timing when the trigger condition is satisfied, and sets "exceeding the threshold value" as the end condition 17.

In a case where the log data information 14 designates the elapsed time as the status information 21, periods of time are set as the start offset 12 and the end offset 13, respectively. The condition generation unit 3 calculates, as the threshold value, a time by subtracting the period of time set as the start offset 12 from the elapsed time at the timing when the trigger condition is satisfied, and sets "the elapsed time exceeding the threshold value" as the start condition 16. Moreover, the condition generation unit 3 calculates, as the threshold value, a time by adding the period of time set as the end offset 13 to the elapsed time at the timing when the trigger condition is satisfied, and sets "the elapsed time exceeding the threshold value" as the end condition 17. It should be noted that the elapsed time is, for example, a time since start of execution of the machining program 36 from the beginning. The elapsed time is reset every execution cycle of the machining program 36, for example.

In a case where the log data information 14 designates the moving distance as the status information 21, distances are set as the start offset 12 and the end offset 13, respectively. The condition generation unit 3 calculates, as the threshold value, a moving distance by subtracting (or adding) the distance set as the start offset 12 from (or to) the moving distance at the timing when the trigger condition is satisfied, and sets "the moving distance exceeding (or falling below) the threshold value" as the start condition 16. Moreover, the condition generation unit 3 calculates, as the threshold value, a moving distance by adding (or subtracting) the distance set as the end offset 13 to (or from) the moving distance at the timing when the trigger condition is satisfied, and sets "the moving distance exceeding (or falling below) the threshold value" as the end condition 17.

In a case where the log data information 14 designates the commanded speed as the status information 21, speeds are set as the start offset 12 and the end offset 13, respectively. The condition generation unit 3 calculates, as the threshold value, a speed by subtracting (or adding) the speed set as the start offset 12 from (or to) the commanded speed at the timing when the trigger condition is satisfied, and sets "the commanded speed exceeding (or falling below) the threshold value" as the start condition 16. Moreover, the condition generation unit 3 calculates, as the threshold value, a speed by adding (or subtracting) the speed set as the end offset 13 to (or from) the commanded speed at the timing when the trigger condition is satisfied, and sets "the commanded speed exceeding (or falling below) the threshold value" as the end condition 17.

In a case where the log data information 14 designates the commanded master axis rotating speed as the status information 21, master axis rotating speeds are set as the start offset 12 and the end offset 13, respectively. The condition generation unit 3 calculates, as the threshold value, a master axis rotating speed by subtracting (or adding) the master axis rotating speed set as the start offset 12 from (or to) the commanded master axis rotating speed at the timing when the trigger condition is satisfied, and sets "the commanded master axis rotating speed exceeding (or falling below) the threshold value" as the start condition 16. Moreover, the condition generation unit 3 calculates, as the threshold value, a master axis rotating speed by adding (or subtracting) the master axis rotating speed set as the end offset 13 to (or from) the commanded master axis rotating speed at the timing when the trigger condition is satisfied, and sets "the commanded master axis rotating speed exceeding (or falling below) the threshold value" as the end condition 17.

The method of calculating each threshold value by the condition generation unit 3 is not limited to the method of adding or subtracting to or from the reference value. For example, each threshold value can be calculated by multiplying the reference value by a predetermined coefficient. In addition, the condition generation unit 3 can adopt various calculation methods as the method of calculating each threshold value.

Furthermore, one or both of the start condition 16 and the end condition 17 can be constituted by a combination of a plurality of conditions. The combination of a plurality of conditions means that a relation of the plurality of conditions is defined by, for example, logical sum, logical product, or exclusive OR of the plurality of conditions, or a combination of these operations.

The logging processing unit 4 reads the log data information 14, the start condition 16 and the end condition 17 generated by the condition generation unit 3 from the condition storage unit 1. Then, the logging processing unit 4 sequentially acquires, from the numerical control unit 6, the status information 21 designated by the log data information 14 and compares the acquired status information 21 with the start condition 16 and the end condition 17. The logging processing unit 4 starts and ends a process of logging diagnosis information 20 at timings based on a result of the comparison.

Here, the diagnosis information 20 is numerical control information (second numerical control information) used for diagnosis of the malfunction. An arbitrary type of information which changes according to the control can be used as the numerical control information. The log data information 14 designates what type of numerical control information is set as the diagnosis information 20 as a logging target. For example, a block number, an elapsed time since start of execution of the machining program 36, a moving distance, a used tool number, a commanded speed, or a commanded master axis rotating speed can be designated by the log data information 14. In addition, the intermediate data of an arbitrary process constituting the numerical control process can be designated by the log data information 14. Further, a rotating speed detection value, a position detection value, a speed detection value, or a torque detection value of a motor can be used as the diagnosis information 20.

During execution of the logging process, the logging processing unit 4 sequentially acquires the diagnosis information 20 and accumulates and stores the acquired diagnosis information 20, as log data 18, in the logging buffer 5. The logging processing unit 4 can process the acquired diagnosis information 20 and then accumulate and store the processed diagnosis information 20, as the log data 18, in the logging buffer 5.

Figure 2:
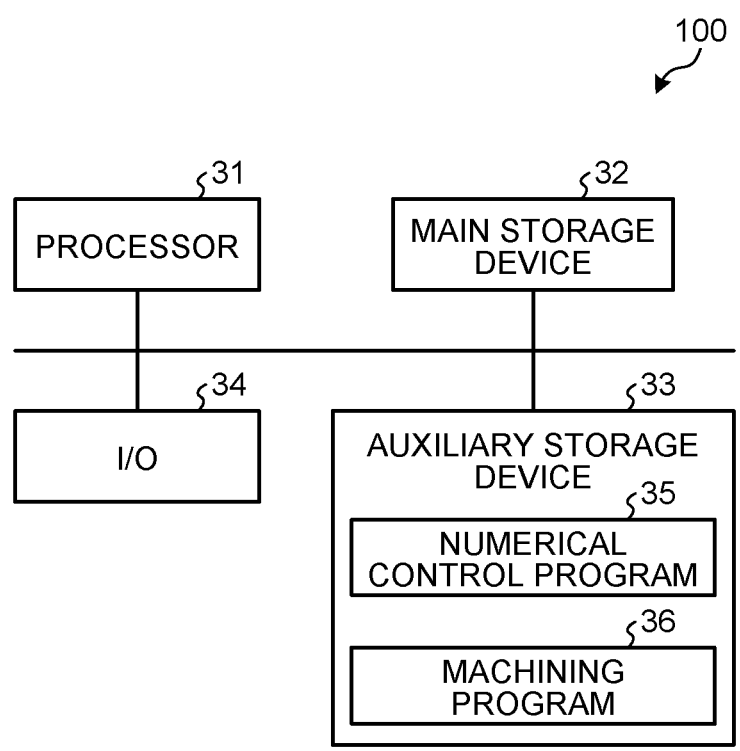
FIG. 2 is a diagram illustrating an example of a hardware configuration of the numerical control apparatus according to the first embodiment.

FIG. 2 is a diagram illustrating an example of a hardware configuration of the numerical control apparatus 100. The numerical control apparatus 100 has a processor 31, a main storage device 32, an auxiliary storage device 33, and an I/O 34. The processor 31, the main storage device 32, the auxiliary storage device 33, and the I/O 34 are connected to each other through a bus.

The processor 31 executes a numerical control program 35, which is a program for realizing the numerical control method according to the present embodiment. The I/O 34 is a connection interface for connection to the drive unit 300. A display device that visually displays various types of information to a user can be connected to the I/O 34. An input device that receives an input of the configuration information 200 from a user can be connected to the I/O 34.

The main storage device 32 functions as a program loading area and a work area of the processor 31. The main storage device 32 is configured by a memory, such as a RAM (Random Access Memory), that can operate at a higher speed than the auxiliary storage device 33. The auxiliary storage device 33 functions as a recording medium that stores therein the numerical control program 35 and the machining program 36 in advance. The auxiliary storage device 33 is configured by, for example, a ROM (Read Only Memory), an HDD (Hard Disk Drive), an SSD (Solid State Drive), a CD-ROM, a DVD-ROM, a detachable memory device, or a combination of these devices.

The numerical control program 35 is read from the auxiliary storage device 33 and is loaded to the main storage device 32 through the bus. The processor 31 executes the numerical control program 35 loaded into the main storage device 32. The processor 31 executes the numerical control program 35 loaded to the main storage device 32, thereby functioning as the trigger determination unit 2, the condition generation unit 3, the logging processing unit 4, and the numerical control unit 6. The numerical control unit 6 temporarily stores various types of intermediate data in the work area of the main storage device 32. Data transfer between the functional components (the trigger determination unit 2, the condition generation unit 3, the logging processing unit 4, and the numerical control unit 6) is performed through the work area of the main storage device 32. The drive command 22 generated by the numerical control unit 6 is output to the drive unit 300 through the I/O 34.

The condition storage unit 1 and the logging buffer 5 are secured in the main storage device 32 or the auxiliary storage device 33. For example, the diagnosis information 20 accumulated and stored in the logging buffer 5 can be externally read out through the I/O 34. In a case where the logging buffer 5 is secured in a detachable memory device, a user can read the diagnosis information 20 by connecting the memory device to a computer. In a case where the numerical control apparatus 100 has a display device, the diagnosis information 20 accumulated and stored in the logging buffer 5 can be displayed on the display device.

It should be noted that the hardware configuration of the numerical control apparatus 100 is not limited to the hardware configuration example described above. For example, all or a part of the trigger determination unit 2, the condition generation unit 3, the logging processing unit 4, and the numerical control unit 6 can be configured by a hardware circuit or a combination of a hardware circuit and software.

Figure 3:
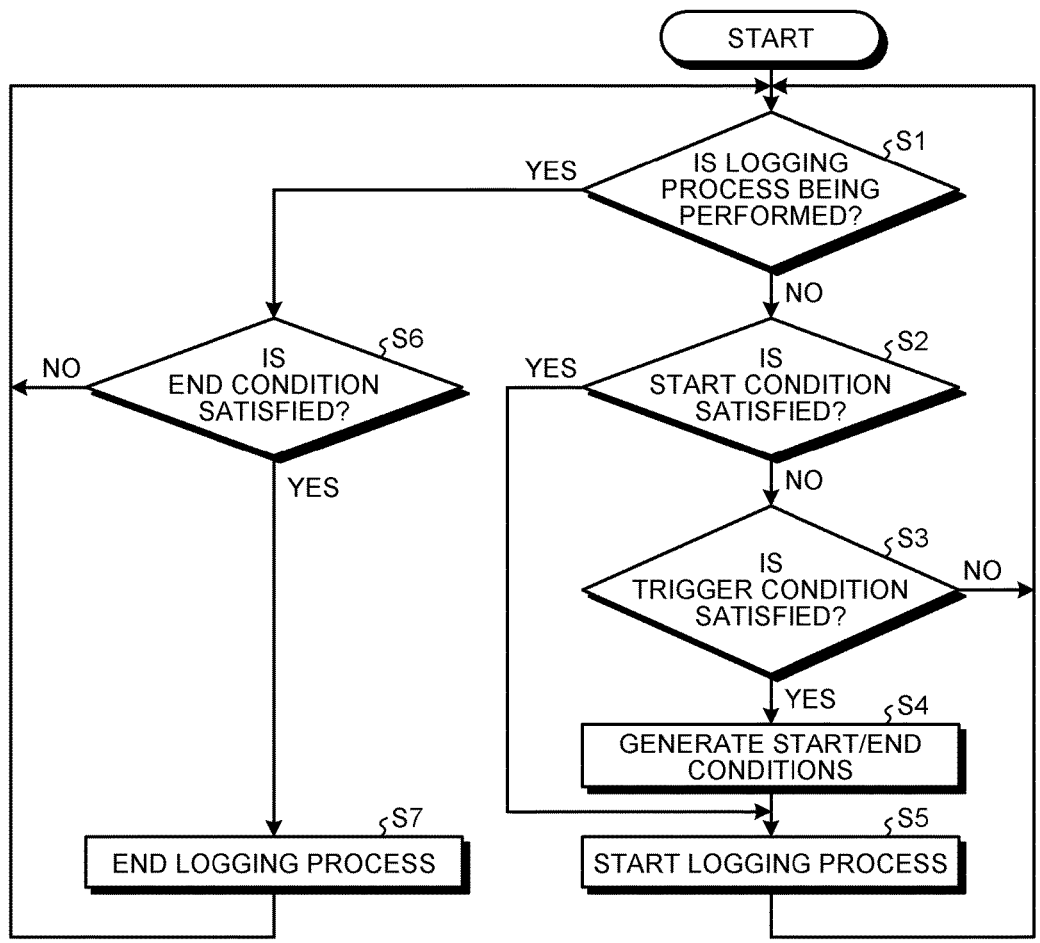
FIG. 3 is a flowchart for explaining an operation of the numerical control apparatus according to the first embodiment.

FIG. 3 is a flowchart for explaining an operation of the numerical control apparatus 100. A series of processing shown in FIG. 3 is performed every sampling period. The sampling period can be equal to a control period, or can be longer than the control period.

First, the logging processing unit 4 determines whether or not the logging process is being performed (Step S1). If the logging process is not being performed, the logging processing unit 4 determines, based on the start condition 16 and the status information 21 at that timing, whether the start condition 16 is satisfied or not (Step S2).

If the start condition 16 is not satisfied (NO at Step S2), the trigger determination unit 2 determines, based on the monitoring information 19 and the trigger condition 11, whether the trigger condition 11 is satisfied or not (Step S3). If the trigger condition 11 is satisfied (YES at Step S3), the condition generation unit 3 uses the status information 21 at that timing and the respective offset values (the start offset 12 and the end offset 13) to generate the timing determination conditions (the start condition 16 and the end condition 17) (Step S4). If the trigger condition 11 is not satisfied (NO at Step S3), the process at Step 1 is performed again.

If the start condition 16 is determined to be satisfied (YES at Step S2), or after the process at Step S4, the logging processing unit 4 starts the logging process (Step S5) and performs the process at Step S1 again. After starting the logging process, the logging processing unit 4 acquires the diagnosis information 20 every sampling period, and stores the acquired diagnosis information 20 as the log data 18 in the logging buffer 5. During a period after the process at Step S5 is performed until a process at Step S7 described later is performed, the logging processing unit 4 is in a state of "under logging process".

If it is determined that the logging process is being performed (YES at Step S1), the logging processing unit 4 determines, based on the end condition 17 and the status information 21 at that timing, whether the end condition 17 is satisfied or not (Step S6). If the end condition 17 is satisfied (YES at Step S6), the logging processing unit 4 ends the logging process (Step S7), and performs the process at Step S1 again. If the end condition 17 is not satisfied (NO at Step S6), the logging processing unit 4 skips the process at Step S7.

FIG. 4 is a timing chart for explaining start and end of the logging process in accordance with the series of processes shown in FIG. 3. As shown, the trigger condition 11 is satisfied for the first time (timing T1). Then, the logging process is performed from the timing T1 to a timing (timing T2) when the end condition 17 set based on the end offset 13 is satisfied. When the trigger condition 11 is satisfied for the second time (timing T3), the logging process is performed with respect to the diagnosis information 20 before and after the timing T3. That is, the logging of the diagnosis information 20 is performed from a timing (timing T4) when the start condition 16 set based on the start offset 12 is satisfied to a timing (timing T5) when the end condition 17 is satisfied. The timing T4 comes before the timing T3.

For example, let us consider a case where an alarm number of "E01" is set as the trigger condition 11, the block number is set as the status information 21 by the log data information 14, the number of blocks "10" is set as the start offset 12, the number of blocks "20" is set as the end offset 13, and the rotating speed detection value of the motor is set as the diagnosis information 20 by the log data information 14. The trigger determination unit 2 determines whether or not an alarm with the alarm number of "E01" is notified. If the alarm with the alarm number of "E01" is notified, the condition generation unit 3 acquires, as the reference value, the block number "N (N is an integer)" at that timing, and then sets "N−10" and "N+20" as the start condition 16 and the end condition 17, respectively. The logging processing unit 4 monitors the block number as the status information 21, and performs the process of logging the rotating speed detection value of the motor for a period when the block number changes from "N−10" up to "N+20".

According to the embodiment of the present invention, as described above, when detecting the event set as the malfunction, the numerical control apparatus 100 generates the start timing of the logging process by performing predetermined arithmetic processing with respect to the status information 21 acquired at the timing when the event is detected. It is therefore possible to acquire the diagnosis information 20 immediately before the malfunction occurrence, without always performing the process of logging the diagnosis information 20. Moreover, it is not required for a user to forecast and set the start timing. That is to say, the numerical control apparatus 100 according to the present embodiment can efficiently acquire the diagnosis information 20 near the timing of the malfunction occurrence.

Furthermore, since the numerical control apparatus 100 generates the start timing of the logging process by performing predetermined arithmetic processing with respect to the status information 21 acquired at the timing when the event set as the malfunction is detected, the numerical control apparatus 100 can acquire the diagnosis information 20 immediately after the malfunction occurrence, without requiring any fixed setting of the end timing.

It is also possible that the condition generation unit 3 generates only one of the start condition 16 and the end condition 17. In a case where only the start condition 16 is to be generated, the logging processing unit 4 can be configured to set, as the end timing of the logging process, a timing when the trigger determination unit 2 detects the event set as the malfunction. In a case where only the end condition 17 is to be generated, the logging processing unit 4 can be configured to set, as the start timing of the logging process, a timing when the trigger determination unit 2 detects the event set as the malfunction.

Furthermore, different trigger conditions 11 can be set for each event set as the malfunction. In the case where the trigger condition 11 is set individually for each event set as the malfunction, the start offset 12, the end offset 13, and the log data information 14 are individually set for each trigger condition 11, and the trigger determination unit 2, the condition generation unit 3, and the logging processing unit 4 perform the respective operations shown in FIG. 3, individually for each trigger condition 11.

Furthermore, the trigger condition 11 for detecting a single event can be constituted by a combination of a plurality of conditions.

REFERENCE SIGNS LIST 1 condition storage unit, 2 trigger determination unit, 3 condition generation unit, 4 logging processing unit, 5 logging buffer, 6 numerical control unit, 11 trigger condition, 12 start offset, 13 end offset, 14 log data information, 15 determination result, 16 start condition, 17 end condition, 18 log data, 19 monitoring information, 20 diagnosis information, status information, 22 drive command, 31 processor, main storage device, 33 auxiliary storage device, 35 numerical control program, 36 machining program, 100 numerical control apparatus, 200 configuration information, 300 drive unit.

The invention claimed is:

1. A numerical control apparatus comprising:
a hardware processor; and
a memory storing instructions which, when executed by the hardware processor, cause the hardware processor to:
detect an initial occurrence of a preset event indicating a malfunction;
refer to sequentially-changing first numerical control information upon detecting the initial occurrence of the preset event, to acquire, as a reference value, the first numerical control information at a timing when the initial occurrence of the preset event is detected;
perform preset first arithmetic processing by using the reference value to generate a first determination condition that, when satisfied, starts logging of sequentially-changing second numerical control information used for diagnosis of the malfunction and perform preset second arithmetic processing by using the reference value to generate a second determination condition that, when satisfied, ends the logging of the sequentially-changing second numerical control information; and
start logging the sequentially-changing second numerical control information after generating the first determination condition and the second determination condition, and then end the logging when the second determination condition is satisfied,
wherein, after the hardware processor ends the logging of the second numerical control information and subsequently detects that the sequentially-changing first numerical control information is changed from a state where the sequentially-changing first numerical control information does not satisfy the first determination condition to a state where the sequentially-changing first numerical control information satisfies the first determination condition, the hardware processor restarts the logging of the sequentially-changing second numerical control information, and wherein the hardware processor analyzes the logged second numerical control information to diagnose and correct the malfunction and thereby accurately machine a workpiece.

2. The numerical control apparatus according to claim 1, wherein the instructions further cause the hardware processor to end the logging of the second numerical control information when the sequentially-changing first numerical control information is changed from a state where the sequentially-changing first numerical control information does not satisfy the second determination condition to a state where the sequentially-changing first numerical control information satisfies the second determination condition.

3. The numerical control apparatus according to claim 2, wherein the first arithmetic processing or the second arithmetic processing includes calculating a threshold value by adding or subtracting a preset offset value to or from the reference value, and the instructions further cause the hardware processor to determine a start timing or an end timing of the logging of the second numerical control information, based on a comparison between the sequentially-changing first numerical control information and the threshold value.

4. The numerical control apparatus according to claim 2, wherein the instructions further cause the hardware processor to repeatedly execute a machining program in order of a block number, the machining program including a plurality of blocks to which respective block numbers are given, wherein the first numerical control information is a block number of a block being executed by the hardware processor, the second arithmetic processing is arithmetic processing that sets, as a threshold value, a value obtained by adding a preset offset value to the reference value, and the second determination condition is a determination condition that is satisfied when the first numerical control information exceeds the threshold value.

5. The numerical control apparatus according to claim 1, wherein the first numerical control information includes any of an alarm number, a block number being executed among a plurality of blocks constituting a machining program, an elapsed time since start of execution of the machining program, a moving distance of a numerical control target, a used tool number, a commanded speed, a commanded master axis rotating speed, a rotating speed detection value, a position detection value, a speed detection value, and a torque detection value of a motor.

6. The numerical control apparatus according to claim 1, wherein the second numerical control information includes any of a block number being executed among a plurality of blocks constituting a machining program, an elapsed time since start of execution of the machining program, a moving distance of a numerical control target, a used tool number, a commanded speed, a commanded master axis rotating speed, a rotating speed detection value, a position detection value, a speed detection value, and a torque detection value of a motor.

7. The numerical control apparatus according to claim 1, wherein the instructions further cause the hardware processor to repeatedly execute a machining program in order of a block number, the machining program including a plurality of blocks to which respective block numbers are given, wherein the first numerical control information is a block number of a block being executed by the hardware processor, the first arithmetic processing is arithmetic processing that sets, as a threshold value, a value obtained by subtracting a preset offset value from the reference value, and the first determination condition is a determination condition that is satisfied when the first numerical control information exceeds the threshold value.

8. A logging method of logging sequentially-changing numerical control information for diagnosing a malfunction of a numerical control apparatus, the logging method comprising:

a first generation operation wherein when the numerical control apparatus detects an initial occurrence of a preset event indicating the malfunction, a condition generator:

acquires, as a reference value, first numerical control information at a timing when the initial occurrence of the preset event is detected; and performs preset first arithmetic processing by using the reference value to generate a first determination condition that, when satisfied, starts logging of sequentially-changing second numerical control information used for diagnosis of the malfunction and performs preset second arithmetic processing by using the reference value to generate a second determination condition that, when satisfied, ends the logging of the sequentially-changing second numerical control information, a logging operation wherein after the condition generator generates the first determination condition and the second determination condition, a logging processor starts logging of the sequentially-changing second numerical control information, and then ends the logging when the second determination condition is satisfied; and a logging restart operation wherein, after the logging processor ends the logging of the second numerical control information and subsequently detects that the sequentially-changing first numerical control information is changed from a state where the sequentially-changing first numerical control information does not satisfy the first determination condition to a state where the sequentially-changing first numerical control information satisfies the first determination condition, the logging processor restarts the logging of the second numerical control information, wherein the logging processor analyzes the logged second numerical control information to diagnose and correct the malfunction and thereby accurately machine a workpiece.

9. The logging method according to claim 8, further comprising:

a logging ending operation wherein the logging processor ends the logging of the second numerical control information when the sequentially-changing first numerical control information is changed from a state where the sequentially-changing first numerical control information does not satisfy the second determination condition to a state where the sequentially-changing first numerical control information satisfies the second determination condition.

10. The logging method according to claim 9, wherein
the first arithmetic processing or the second arithmetic processing includes calculating a threshold value by adding or subtracting a preset offset value to or from the reference value, and
the logging restart operation and the logging ending operation include a timing determination operation wherein the logging processor determines a start timing or an end timing of the logging of the second numerical control information, based on a comparison between the sequentially-changing first numerical control information and the threshold value.

11. The logging method according to claim 8, wherein the first numerical control information includes any of an alarm number, a block number being executed among a plurality of blocks constituting a machining program, an elapsed time since start of execution of the machining program, a moving distance of a numerical control target, a used tool number, a commanded speed, a commanded master axis rotating speed, a rotating speed detection value, a position detection value, a speed detection value, and a torque detection value of a motor.

12. The logging method according to claim 8, wherein the second numerical control information includes any of a block number being executed among a plurality of blocks constituting a machining program, an elapsed time since start of execution of the machining program, a moving distance of a numerical control target, a used tool number, a commanded speed, a commanded master axis rotating speed, a rotating speed detection value, a position detection value, a speed detection value, and a torque detection value of a motor.

\* \* \* \* \*